(12) United States Patent
Gilbert (10) Patent No.: US 11,511,817 B2
(45) Date of Patent: *Nov. 29, 2022

(54) MOBILE INDUSTRIAL EQUIPMENT AND METHODS OF USE

(71) Applicant: Steve L. Gilbert, Toquerville, UT (US)

(72) Inventor: Steve L. Gilbert, Toquerville, UT (US)

( * ) Notice: Subject to any disclaimer, the term of this patent is extended or adjusted under 35 U.S.C. 154(b) by 583 days.

This patent is subject to a terminal disclaimer.

(21) Appl. No.: 15/608,047

(22) Filed: May 30, 2017

(65) Prior Publication Data

US 2017/0259859 A1 Sep. 14, 2017

Related U.S. Application Data (60) Continuation of application No. 14/875,375, filed on Oct. 5, 2015, now Pat. No. 9,663,161, which is a continuation of application No. 14/135,330, filed on Dec. 19, 2013, now Pat. No. 9,149,811, which is a division of application No. 13/899,848, filed on May 22, 2013, now Pat. No. 8,636,296.

(51) Int. Cl.
| | | |
|---|---|---|
| *B62D 55/04* | (2006.01) | |
| *B62D 55/02* | (2006.01) | |
| *B62D 59/04* | (2006.01) | |
| *B62D 61/12* | (2006.01) | |
| *B02C 21/02* | (2006.01) | |
| *B62D 65/02* | (2006.01) | |

(52) U.S. Cl.
CPC .......... *B62D 55/04* (2013.01); *B02C 21/026* (2013.01); *B62D 55/02* (2013.01); *B62D 59/04* (2013.01); *B62D 61/12* (2013.01); *B62D 65/02* (2013.01)

(58) Field of Classification Search
CPC ........ B62D 55/04; B62D 55/02; B62D 59/04; B62D 61/12; B02C 21/026
See application file for complete search history.

(56) References Cited

U.S. PATENT DOCUMENTS

| | | |
|---|---|---|
| 1,376,648 A | 5/1921 | Schneider |
| 1,376,649 A | 5/1921 | Schneider |
| 1,550,982 A | 8/1925 | Phillips |

(Continued)

OTHER PUBLICATIONS

Notice of Allowance for U.S. Appl. No. 14/875,375 dated Feb. 8, 2017.

(Continued)

*Primary Examiner* — Jacob D Knutson
*Assistant Examiner* — Marlon A Arce
(74) *Attorney, Agent, or Firm* — Ray Quinney & Nebeker P.C.; Paul N. Taylor (57) ABSTRACT

In one example, mobile industrial equipment for coupling to a truck for on highway transportation is provided. The mobile industrial equipment includes a frame to connect to the truck, a plurality of wheels connected to the frame, and a track assembly connected to the frame. In another example a method for using mobile equipment is provided. The method includes transporting mobile industrial equipment over the highway with a plurality of wheels connected to a frame of the mobile industrial equipment. The frame of the mobile industrial equipment is separated from the truck. The mobile industrial equipment is moved while separated from the truck using a track connected to the frame of the mobile industrial equipment.

17 Claims, 8 Drawing Sheets

(56) References Cited

U.S. PATENT DOCUMENTS

| | | | |
|---|---|---|---|
| 1,953,051 A | 3/1934 | Linn | |
| 2,287,290 A * | 6/1942 | Brown | B60K 17/36 180/9.28 |
| 2,794,565 A | 6/1957 | Ratliff | |
| 3,285,449 A | 11/1966 | Hand | |
| 3,460,691 A | 8/1969 | Wieger | |
| 3,594,018 A | 7/1971 | Graetz | |
| 3,656,780 A | 4/1972 | Nordstrom | |
| 3,929,204 A | 12/1975 | Newell | |
| 4,106,634 A | 8/1978 | Becker | |
| 4,204,583 A | 5/1980 | Toyoura | |
| 5,161,744 A | 11/1992 | Schoop et al. | |
| 5,287,938 A * | 2/1994 | Welling | B60F 5/00 180/9.28 |
| 5,390,752 A | 2/1995 | Urbanczyk | |
| 5,441,206 A | 8/1995 | Schade | |
| 5,460,332 A | 10/1995 | Frick | |
| 5,601,303 A | 2/1997 | Underwood | |
| 5,975,226 A | 11/1999 | Matsimoto | |
| 6,076,620 A | 6/2000 | Horsch | |
| 6,302,635 B1 | 10/2001 | Kolker | |
| 6,311,821 B1 | 11/2001 | Douglas | |
| 6,540,166 B2 | 4/2003 | Frick | |
| 6,557,881 B2 | 5/2003 | Kortesalmi | |
| 6,957,822 B2 | 10/2005 | Douglas | |
| 7,264,190 B2 | 9/2007 | Smith et al. | |
| 7,384,231 B2 | 6/2008 | Douglas | |
| 7,546,890 B2 | 6/2009 | Grobler | |
| 7,588,204 B2 | 8/2009 | Douglas | |
| 7,588,107 B2 * | 9/2009 | Nicholes | B60P 3/1033 180/14.2 |
| 7,686,561 B2 | 3/2010 | Smith et al. | |
| 7,950,675 B1 | 5/2011 | Quenzi et al. | |
| 8,256,540 B1 * | 9/2012 | Copeland | B62D 55/084 180/9.1 |
| 8,636,296 B1 | 1/2014 | Gilbert | |
| 9,149,811 B1 | 10/2015 | Gilbert | |
| 9,663,161 B2 | 5/2017 | Gilbert | |
| 2001/0020656 A1 | 9/2001 | Frick | |
| 2004/0135344 A1 | 7/2004 | Douglas | |
| 2006/0144974 A1 | 7/2006 | Umeda | |
| 2006/0254833 A1 | 11/2006 | Grobler | |
| 2008/0103005 A1 * | 5/2008 | Gleasman | B62D 11/18 475/28 |
| 2012/0037434 A1 | 2/2012 | Godin et al. | |
| 2012/0148362 A1 | 6/2012 | Lawlor et al. | |
| 2016/0107166 A1 | 4/2016 | Tschantz | |

OTHER PUBLICATIONS

Non-Final Office Action for U.S. Appl. No. 14/875,375 dated Aug. 12, 2016.

Notice of Allowance for U.S. Appl. No. 14/135,330 dated Apr. 30, 2015.

Non-Final Office Action for U.S. Appl. No. 14/135,330 dated Dec. 16, 2014.

Notice of Allowance for U.S. Appl. No. 13/899,848 dated Dec. 13, 2013.

Non-Final Office Action for U.S. Appl. No. 13/899,848 dated Oct. 8, 2013.

Mobile Crusher "KEESTRACK", retrieved from http://web.archive.org/web/20040325003713/http://keestrack.com, retrieved Sep. 26, 2018, 1 page.

* cited by examiner

MOBILE INDUSTRIAL EQUIPMENT AND METHODS OF USE

CROSS-REFERENCE TO RELATED APPLICATIONS

This application is a continuation of U.S. patent application Ser. No. 14/875,375, filed Oct. 5, 2015, which is a continuation of U.S. patent application Ser. No. 14/135,330, filed Dec. 19, 2013, which is a divisional application of U.S. patent application Ser. No. 13/899,848 filed 22 May 2013, the entireties of which are hereby incorporated by reference.

BACKGROUND

The Field of the Invention

The present application relates to the field of mobile industrial equipment and methods of use. More particularly, the present invention relates to methods, machines, systems, sub-systems, assemblies, and components for providing mobile industrial equipment that may be transported over the highway and may be moved at a job site.

Related Technology

Industrial equipment may be used at a job site for various tasks. Some industrial equipment must be transported on the highway on the bed of a trailer. Tracked vehicles, for example, are not capable of efficient transport over the highway, as tracked vehicles have a lower top speed than most wheeled vehicles. Thus, tracked vehicles are generally transported over the highway on a trailer.

However, loading and unloading industrial equipment on and off of a trailer is laborious and expensive. Furthermore, the width of these tracked machines may make them larger than a width of a single highway lane. Likewise, some industrial equipment may be too large and/or too heavy to ride on a trailer fully assembled. These machines may require multiple trailers for on highway transport, resulting in added costs.

Some industrial equipment have been modified to include a wheel assembly. Wheeled industrial equipment may be transported on their own power or may include a truck connector (i.e. a kingpin) that may be connected to a semi-truck so that the industrial equipment may be driven over the highway to a job site. These machines are then disconnected from the semi-truck and left at the job site for operation.

However, once at the job site, if one of these machines needs to be moved to another location at the job site, it must either be reconnected to the semi-truck to be moved or loaded onto a trailer. Furthermore, many of these devices have industrial assemblies that are connected to their frames once they are positioned at the job site. In order to move these machines, these attachments must be removed or otherwise adjusted in a way that slows down the job in order for the semi-trailer to be reconnected.

Alternatively, the industrial equipment could be left at a single location at the job site. However, many jobs would require hauling material to the industrial equipment from multiple locations at the job site. For example, in a pit mine operation where rock is removed from the wall of the mine, the material would have to be hauled from various locations around the mine to the industrial equipment. This requires expensive loading and hauling costs as a large rock truck and/or a large loader may be required. The ability to move the industrial equipment may reduce and/or eliminate these loading and hauling costs.

Thus, a need exists for methods, machines, systems, sub-systems, assemblies, and components for providing mobile industrial equipment that may be transported over the highway and may be moved at a job site.

BRIEF SUMMARY OF SOME ASPECTS OF THE DISCLOSURE

It should be noted that the embodiments disclosed herein do not constitute an exhaustive summary of all possible embodiments, nor does this brief summary constitute an exhaustive list of all aspects of any particular embodiment(s). Rather, this brief summary simply presents selected aspects of some example embodiments. It should be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular technical effect(s) or solution(s).

Disclosed embodiments are generally concerned with methods, machines, systems, sub-systems, assemblies, and components for providing mobile industrial equipment that may be transported over the highway and may be moved at a job site. Embodiments within the scope of this disclosure may include aspects of the present disclosure together with any one or more of the following elements, and features of elements, in any combination. Following is a brief list of some example embodiments. It should be noted that these, and other embodiments disclosed herein, are not necessarily mutually exclusive of each other and may share one or more common aspects.

In one embodiment, mobile industrial equipment for coupling to a truck for on highway transportation is described. The mobile industrial equipment includes a frame configured to connect to the truck, a plurality of wheels connected to the frame, and a track assembly connected to the frame.

In another embodiment, a mobile rock crushing device for coupling to a truck for on highway transportation and transportable at a job site without the truck is described. The mobile rock crushing device includes a frame having a truck connector (kingpin) proximate a front portion of a frame to connect to the truck, the frame having a center of gravity, a conveyor connected to the frame to transport crushed materials, the conveyor extending beyond the truck connector (kingpin) in an on-site configuration, a wheel assembly at least partially permanently connected to the frame proximate a back end, the wheel assembly including three axles connected to the frame through a plurality of suspensions, each axle having at least a pair of wheels, the wheels configured to contact a ground surface and being capable of transporting the mobile rock crushing device on the highway, the wheels configured to contact the ground surface at a wheel point of contact relative to the frame, the wheel assembly having a lateral end, the wheel assembly being located longitudinally behind the center of gravity of the frame, and a track connected to an intermediate portion of the frame at the job site such that the track contacts the ground surface at a track point of contact relative to the frame, the wheel point of contact being vertically closer to the frame than the track point of contact such that when the first track contacts the ground, the wheels do not contact the ground, the track extending laterally beyond the a lateral end of the wheel assembly, the track connected to the frame such that at least a portion of the track is centered relative to the center of gravity of the frame, the track capable of moving the machine while the conveyor is connected to the frame.

In some embodiments, the plurality of wheels are connected to a solid axle. The wheel assembly, in further embodiments, includes at least one axle, the at least one axle having at least a pair of wheels, the wheels configured to contact a ground surface and being capable of transporting the mobile rock crushing device on the highway, the wheels configured to contact the ground surface at a wheel point of contact relative to the frame, and wherein the track assembly is connected to the frame such that the track assembly contacts the ground surface at a track assembly point of contact relative to the frame, the wheel point of contact being vertically closer to the frame than the track assembly point of contact such that when the track assembly contacts the ground, the wheels do not contact the ground.

In some embodiments, a plurality of stabilizers connected to the frame is included where the plurality of stabilizers contact the ground at a stabilizer point of contact relative to the frame. The stabilizer point of contact may be vertically further from the frame than the wheel point of contact or the track assembly point of contact such that when the machine is in operation, the plurality of stabilizers contact the ground but the track assembly and the wheels do not contact the ground.

The wheel assembly, in some embodiments, includes at least one axle that has at least a pair of wheels. The wheel assembly may have a lateral end. The track assembly may extends laterally beyond the lateral end of the wheel assembly. In further embodiments, the wheel assembly is located longitudinally behind the center of gravity of the frame and the track assembly is connected to the frame such that at least a portion of the track assembly is longitudinally centered relative to the center of gravity of the frame. In further embodiments, the power plant is coupled to the track assembly to transmit power to the track assembly but is not coupled to the wheel assembly such that the wheel assembly does not directly receive power from the power plant.

In some embodiments, the track assembly is configured to move the frame while the truck connector is uncoupled from the truck. The track assembly, in further embodiments, includes a first track and a second track that are configured to be moved both independently and simultaneously.

The track assembly, in some embodiments, is separably coupled to the frame and is self propelled. In further embodiments, the track assembly is separably coupled to the frame via a stub shaft and pipe configuration.

In some embodiments, the wheels are highway legal and configured to be driven at speeds exceeding 45 mph. The power plant, in further embodiments, is a generator coupled to the frame The mobile industrial equipment, in some embodiments, is selected from the group consisting of a screening plant, a conveyor, an impactor, a crusher, a horizontal shaft impactor, and a vertical shaft impactor. In further embodiments, the mobile industrial equipment is used in an industry selected from the group consisting of crushing, mining, screening, construction, demolition, recycling, environmental cleanup, forestry, and aggregate industries.

In some embodiments, an industrial assembly is connected to the frame. At least a portion of the industrial assembly may extend beyond the truck connector (kingpin) in an on-site configuration such that the truck cannot be connected to the truck connector without adjusting or removing at least a portion of the industrial assembly.

In a further embodiment, a method for using mobile industrial equipment is described. The method includes transporting mobile industrial equipment over the highway with a plurality of wheels connected to a frame of the mobile industrial equipment. The frame of the mobile industrial equipment is separated from the truck. The mobile industrial equipment is moved using a track connected to the frame of the mobile industrial equipment while separated from the truck.

In some embodiments, the method includes coupling a frame of the mobile industrial equipment to the truck and decoupling the frame of the mobile industrial equipment from the truck before connecting an industrial assembly to the frame. The mobile industrial equipment, in further embodiments, is moved while the industrial assembly is connected to the frame without being coupled to the truck.

BRIEF DESCRIPTION OF THE DRAWINGS

To further clarify the aspects of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

This description relates to mobile industrial equipment and methods of use. More particularly, the description herein relates to methods, machines, systems, sub-systems, assemblies, and components for providing mobile industrial equipment that may be transported over the highway and may be moved at a job site. More particularly still, the description relates to mobile industrial equipment and methods of use which can be transported over the highway with a plurality of wheels and can be moved about a job site with a track assembly.

Reference will now be made to the drawings to describe various aspects of example embodiments of the invention. It is to be understood that the drawings are diagrammatic and schematic representations of such example embodiments, and are not limiting of the present invention. Moreover, while various drawings are provided at a scale that is considered functional for some embodiments, the drawings are not necessarily drawn to scale for all contemplated embodiments. No inference should therefore be drawn from the drawings as to any required scale.

In the following description, numerous specific details are set forth in order to provide a thorough understanding of the present invention. It will be obvious, however, to one skilled in the art that the present invention may be practiced without these specific details. In other instances, well-known aspects of mobile industrial equipment have not been described in particular detail in order to avoid unnecessarily obscuring aspects of the disclosed embodiments.

The disclosed embodiments may be usefully employed in connection with a variety of systems and devices, and in a variety of different applications. By way of illustration, but not limitation, embodiments disclosed herein may, in some applications, be employed in connection.

Industrial equipment is taken herein to mean equipment used in a variety of industries. These industries include crushing, mining, screening, construction, demolition, recycling, environmental cleanup, forestry, and aggregate industries. Examples of the types of equipment used in these industries include screening plants, conveyors, impactors, crushers, horizontal shaft impactors, vertical shaft impactors, other mining or aggregate equipment, or other equipment.

Industrial equipment typically have either wheels or tracks to transport them at a job site, but not both wheels and tracks. Tracked equipment are well suited for moving around a job site, but must have separate transportation to the job site, usually via a low-boy trailer. Wheeled equipment are well suited for transportation on the highway to the job site, but are not well suited for moving around the job site.

In order to transport tracked industrial equipment to a job site, the tracked equipment must be loaded onto a trailer. However, loading and unloading industrial equipment on and off of a trailer is laborious and expensive. Furthermore, the width of these tracked machines may make them larger than a width of a single highway lane. Likewise, some industrial equipment may be too large and/or too heavy to ride on a trailer fully assembled. These machines may require multiple trailers for on highway transport, resulting in added costs.

In order to move wheeled equipment about a job site, it must either be reconnected to the semi-truck to be moved or loaded onto a trailer. Furthermore, many of these devices have industrial assemblies that are connected to their frames once they are positioned at the job site. In order to move these machines, these attachments must be removed or otherwise adjusted in a way that slows down the job in order for the semi-trailer to be reconnected.

For example, in order to move a crusher that has been modified to include a wheel assembly from one location at a job site to another location typically includes the following steps: 1) remove the feeder with a crane, 2) remove the conveyer from underneath its frame with a crane, 3) load the feeder and conveyer onto a trailer with a crane for transport to the other location, 4) reconnect the semi-truck to the truck connector (kingpin), 5) transport the frame with the semi-truck and the feeder and conveyer with the trailer and an additional semi-truck to another location at the job site, 6) position the frame with the semi-truck, 7) disconnect the semi-truck from the truck connector, 8) reattach, with a crane, the feeder, 9) reattach, with a crane, the conveyer, 10) restart the operation. These steps are time consuming and therefore costly.

In order to provide both highway transportability and job site mobility, embodiments of the present invention provide mobile industrial equipment that includes both wheels and a track assembly.

Turning now to the Figures, consideration is given to aspects of some example operating environments in which one or more of the concepts disclosed herein may be employed. It should be appreciated, however, that the illustrated embodiments are merely examples and that other embodiments are contemplated as being within the scope of the invention.

Figure 1:
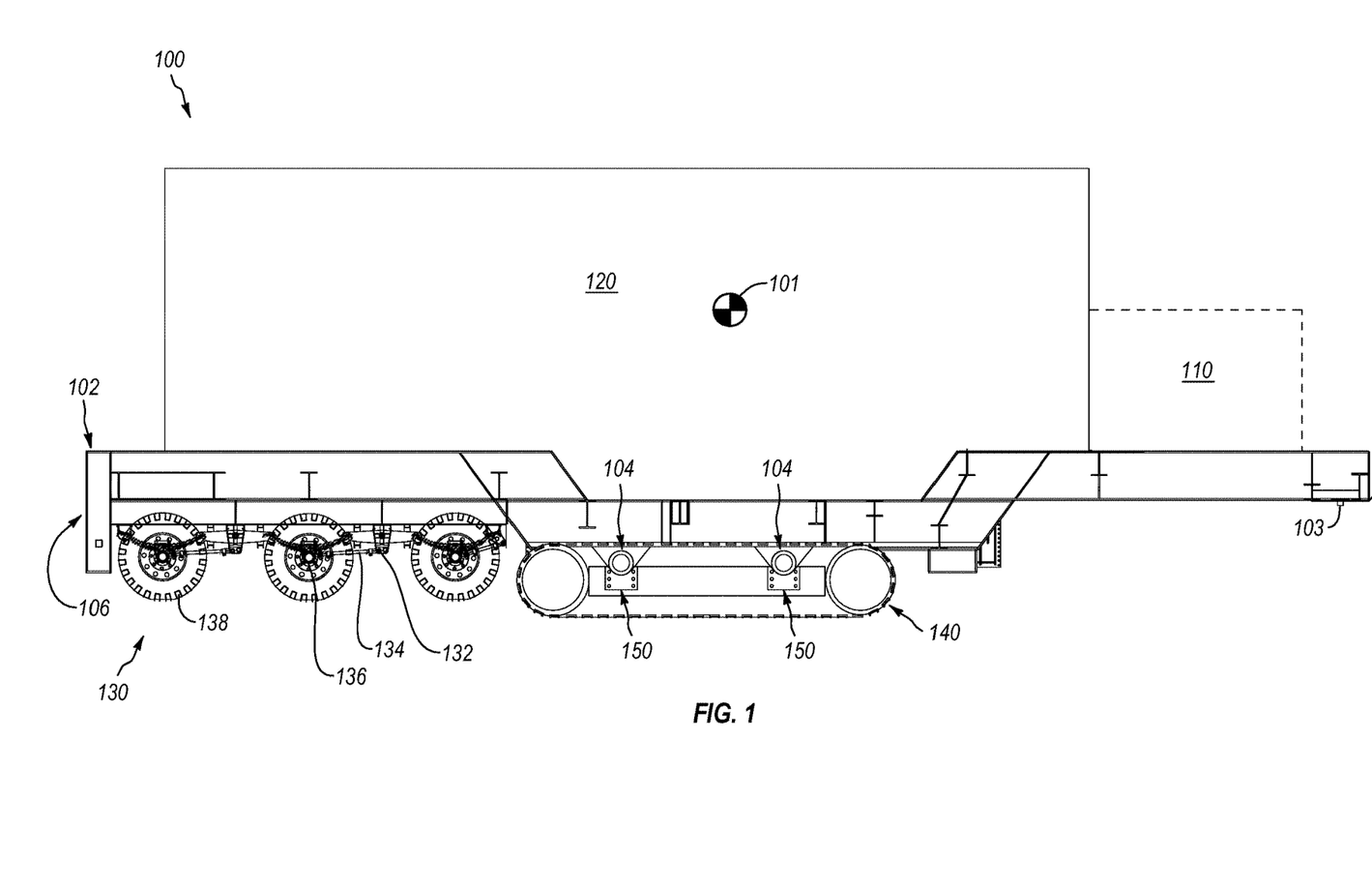
FIG. 1 illustrates a side view of one example embodiment of mobile industrial equipment.

FIG. 1 illustrates an example embodiment of mobile industrial equipment 100. The industrial equipment 100 includes a frame 102. The frame 102 is shown with a vertically offset portion (not labeled) near the center of gravity 101 of the industrial equipment 100. In other embodiments, the frame 102 may be substantially straight, offset, or otherwise configured to support at least one component of the industrial equipment 100. The frame 102 includes a truck connector 103 that may be connected to a truck (such as a semi-truck or other transport). In the present embodiment, the truck connector 103 is a standard kingpin connector.

The frame 102 is connected to an industrial assembly 120. The industrial assembly 120 may include screening plants, conveyors, impactors, crushers vertical shaft impactors, or other equipment and is shown as a general block for this purpose. It is understood that the location of the industrial assembly 120 may vary relative to the frame 102. For example, components of the industrial assembly 120 may extend beyond the horizontal footprint of the frame 102. Furthermore, components of the industrial assembly 120 may be connected to the frame above, below, within, on the sides of the frame, be otherwise connected, or combinations thereof.

The industrial assembly 120 may be powered by an optional power plant 110. The power plant 110 may include a generator or other power plant. Additionally or alternatively, power may be provided to the industrial assembly 120 through a commercial power source, such as a municipal electrical line. Regardless, in at least one embodiment, the industrial assembly 120 is powered by a power source that is not the same as the power source that transports the industrial equipment 100 over the highway. In other words, where a semi-truck is used to pull the industrial equipment 100 to a job site, the industrial assembly is powered by another power source that is not the power source (i.e. engine) of that semi-truck.

A wheel assembly 130 is connected to the frame 102. The function of the wheel assembly 130 is to provide support to the frame 102 as the industrial equipment 100 is transported by a truck or other transport. The wheel assembly 130 may be designed to support various loads. For example, the gross weight of the industrial equipment 100 may be in the range of five tons to three hundred tons.

As shown in FIG. 1, the wheel assembly 130 is connected near the back end of the frame 102. However, in other embodiments, the wheel assembly 130 may be otherwise located. The wheel assembly 130 may be located longitudinally away from the center of gravity 101 of the industrial equipment 100. In other words, the wheel assembly 130 may be located behind the center of gravity 101 such that the wheel assembly 130 and the truck connector 103 may split the weight of the industrial equipment 100. The division of the weight of the industrial equipment 100 may be split generally evenly (within a few hundred pounds) in some embodiments. In other embodiments, the wheel assembly 130 may bear substantially more (within a then thousands of pounds) than half of the weight.

The wheel assembly 130 may include a plurality of wheels 138. The wheels 138 may be connected to axles 136 or may be otherwise connected to the frame 102. The wheels 138 may be highway-legal tires that are capable of being used to transport the industrial equipment 100 over the highway. For example, the wheels should be capable of being loaded and driven over forty-five miles per hour. Highway legal tires include a tire that satisfies the legal requirements for on highway use. For instance, a highway legal tire would meet national safety requirements, including tread, loading, or other requirements.

The wheels 138 in the present embodiment are not driven. That is, the wheels 138 are connected to a solid axle without a direct power source rather than to a differential or other power transmitter for directly powering the wheels. Thus, when the industrial equipment 100 is pulled on the highway by a truck or other transport, the wheels 138 are merely pulled by the truck not directly connected to a power source (via, for example, a transmission). In other embodiments, the wheels 138 may be directly powered.

The wheel assembly 130, in the present embodiment, includes a plurality of suspension connectors 132 that connect to a plurality of springs 134. The springs 134 then connect to at least one axle 136. In other embodiments, other suspensions configurations may be used. In further embodiments, no suspension may be used and the wheels 138 may be directly connected to the frame (i.e. the axles 136 may be directly connected to the frame).

The industrial equipment 100 includes track assembly 140. The track assembly 140 is connected to the frame 102. In the present embodiment, the track assembly 140 is removably connected to the frame 102. For example the track assembly 140, shown in FIG. 1, includes track connectors 150 that are connected to the frame 102 via track supports 104. In other embodiments, the track assembly 140 may be permanently connected to the frame 102.

The track assembly 140, as shown in FIG. 1, is located such that it is longitudinally centered relative to the center of gravity 101 of the industrial equipment 100. In other embodiments, only a portion of the track assembly 140 may be longitudinally centered relative to the center of gravity 101 of the industrial equipment 100. In other words, depending on the particular circumstances, the precise location of the tracks relative to the frame may be selected such that the longitudinal center of the tracks may be positioned at, forward of, or behind the center of gravity 101. In some embodiments, at least a portion of the track assembly 140 may longitudinally overlap at least a portion of the wheels 138. In other words, as shown in FIG. 1, the track assembly 140 may be connected to the frame 102 at a location sufficiently rearward that at least a portion of the track assembly 140 occupies the same longitudinal space as at least a portion of the wheel assembly 130. In one example, at least a portion of the track assembly 140 may overlap at least a portion of the forward-most wheel 138 of the wheel assembly 130.

Example track assemblies 140 may include a side frame from Track One in Italy. Other track assemblies 140 may also be used. For example, Caterpillar, Berco, or other tracks may be used. The track assembly 140 may include a first track and a second track. The tracks may be independently and/or simultaneously operated. For example, one track may be engaged while the other remains in neutral, one track may move at one speed while the other moves at another speed, both tracks may move at the same speed, etc.

The track assembly 140 may be powered by the power plant 110. For example, the power plant 110 may provide hydraulic or electric power to the track assembly 140. In other embodiments, the power plant 110 may provide other power modes. For example, the power plant 110 may provide electrical power to a DC motor.

Figure 2:
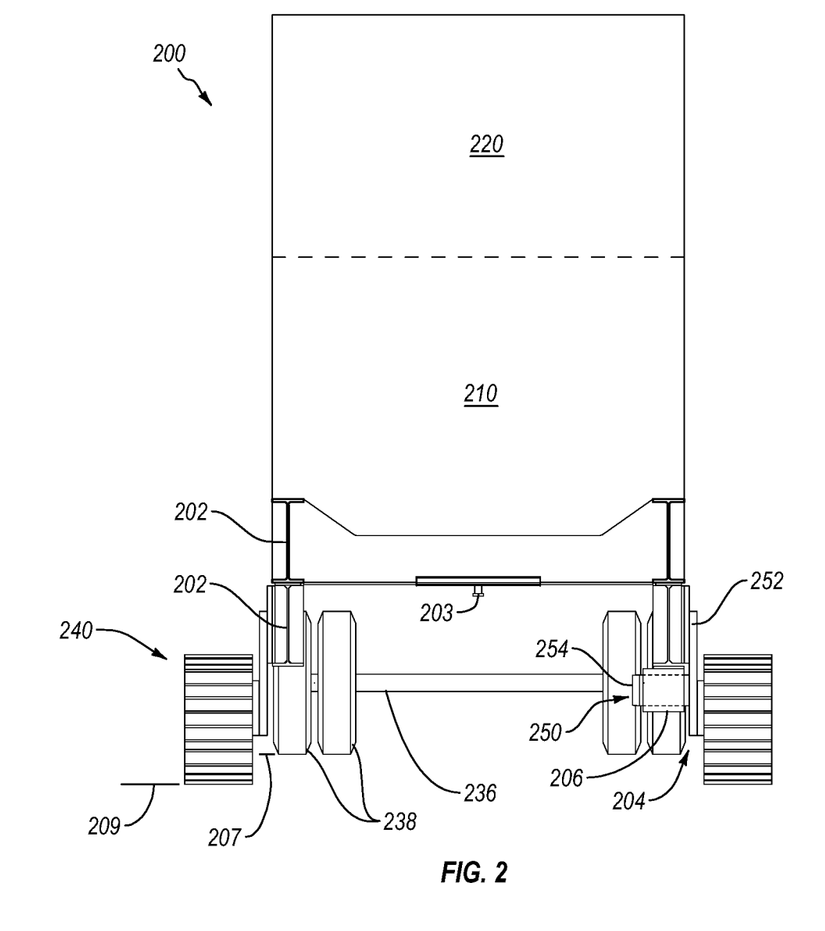
FIG. 2 illustrates a partially assembled front view of another example embodiment of mobile industrial equipment.

FIG. 2 illustrates a partially disassembled front view of another example embodiment of mobile industrial equipment 200. The mobile industrial equipment 200 of this embodiment may be at least partially functionally similar to that of the industrial equipment 100 previously described above and shown in FIG. 1 in most respects, wherein certain features will not be described in relation to this embodiment wherein those components may function in the manner as described above and are hereby incorporated into this alternative embodiment described below. Like structures and/or components are given like reference numerals.

The mobile industrial equipment 200 includes a frame 202 that supports an industrial assembly 220 that may be powered by an optional power plant 210. The frame 202 may include a truck connector 203 that connects to a truck or other transport. A wheel assembly 230 is connected to the frame 202 as is track assembly 240.

The industrial equipment 100 may include a plurality of stabilizers 106. The stabilizers may be located on the lateral periphery of the industrial equipment 100. The industrial equipment may include a plurality of stabilizers 106 and is shown in FIG. 1 with a pair of stabilizers 106. More and/or fewer stabilizers 106 may be used. In some embodiments, the frame 102 may include integrated jacks that may lift the frame 102. Integrated jacks may facilitate the installation of the track assembly 240 and/or may lift the wheel assembly 130 off of the ground.

The track assembly 240 is connected to the frame 202 via track connectors 250. The track connectors 250 are connected to the track assembly 240 and to the track supports 204. In the present embodiment, the track assembly 240 is removably connected to the frame 202. In this embodiment, the track connectors 250 include a bolt flange 252 and a stub shaft 254 and the track supports 204 include a support shaft 206. The track assembly 240 may be lifted (via a forklift or other lifting mechanism) and connected to the frame 202. For example, the stub shaft 254 may be inserted into the support shaft 206 and the bolt flange 252 or pin may be bolted to the frame 202.

For purposes of illustration, the track connectors 250 and track supports 204 are only shown on one of the track assemblies 240 to more clearly show the vertical and lateral relationship between the track assembly 240 and the wheel assembly 230. Specifically, the wheels 238 of the wheel assembly 230 contact the ground at a wheel point of contact 205. The track assembly 240 contacts the ground at a track point of contact 207. As shown in FIG. 2, the track point of contact 207 is vertically further from the frame 202 than the wheel point of contact 205. This allows the industrial equipment 200 to be transported on the job site while the track assembly 240 contacts the ground without the wheel assembly 230 contacting the ground. In other embodiments, however, the track assembly 240 and the wheel assembly 230 may contact the ground at the same time.

The track assembly 240 is located further laterally outward from the longitudinal axis of the industrial equipment 200 than the wheel assembly 230. For example, as shown in FIG. 2, the wheel assembly 230 is located beneath and within a lateral periphery of the frame 202. The track assembly 240, as shown in FIG. 2, is located outside of the lateral periphery of the frame 202. In other words, the track assembly 240 extends laterally beyond a lateral end of the wheel assembly 230. In other embodiments, at least a portion of the wheel assembly 230 may be located outside of the lateral periphery of the frame 202 and/or at least a portion of the track assembly 240 may be located within the lateral periphery of the frame 202. In further embodiments, at least a portion of both the track assembly 240 and the wheel assembly 230 may be located within the same vertical plane.

In some embodiments, the track assembly 240 may be movably coupled to the frame 202. For example, the track assembly 240 may be configured to raise and/or lower vertically with respect to the frame 202. This may be accomplished, for example, with a hydraulic lift or other mechanism that can raise and/or lower the track assembly 240. Thus, the track assembly 240 may be lowered from a stowed configuration (where the track point of contact 207 would be higher [i.e. vertically closer to the frame] than the wheel point of contact 205) to a engaged configuration (where the track point of contact 207 would be lower [i.e. vertically farther from the frame] than the wheel point of contact 205). This process may also be reversible where the track assembly 240 may be raised from the engaged configuration to the stowed configuration. Conversely, in another embodiment, the track assembly 140 could be mounted in a fixed position relative to the frame 102 and the wheel assembly 130 could be raised and lowered by, for example, hydraulic lift mechanisms relative to the frame 102 and relative to the track assembly 140.

Figure 3A:
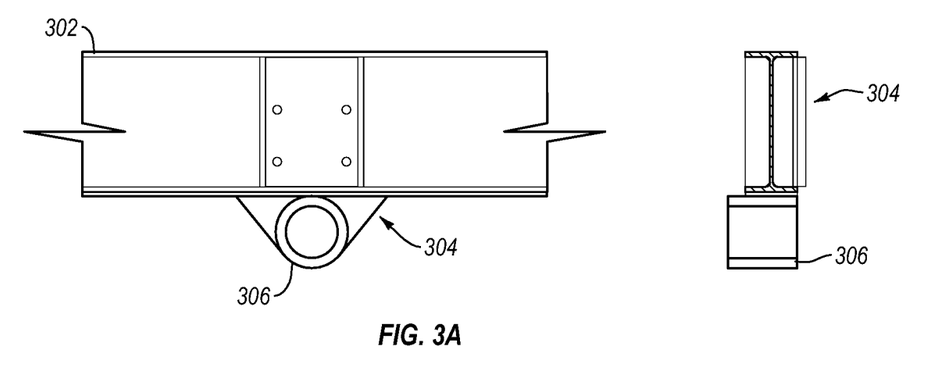
FIGS. 3A-3C illustrate various views of an example embodiment of a track connector and track support.
Figure 3B:
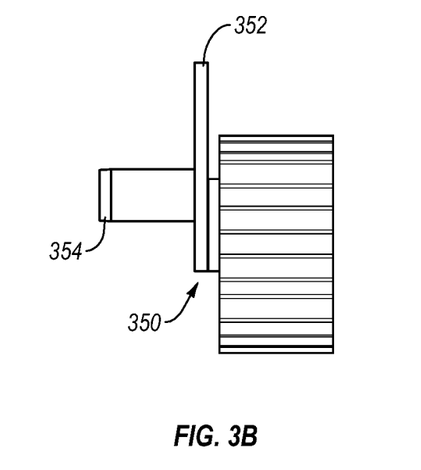
Figure 3C:
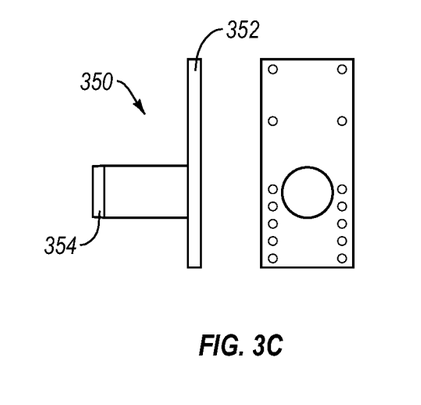

FIGS. 3A-3C illustrate various views of an example embodiment of a track connector 350 and track support 304. The track connector 350 and track support 304 of this embodiment may be at least partially functionally similar to that of the track connectors 150, 250 and track supports 104, 204 previously described above and shown in FIGS. 1-2 in most respects, wherein certain features will not be described in relation to this embodiment wherein those components may function in the manner as described above and are hereby incorporated into this alternative embodiment described below. Like structures and/or components are given like reference numerals.

As shown in FIG. 3A a frame 302 includes a track support 304 connected to the frame 302. The track support 304 includes a support shaft 306. The track support 304 may be connected to the frame 302 by welding, via bolts, other connection types, or combinations thereof. As shown in FIG. 3B, the support shaft 306 of the track support 304 may extend to a lateral periphery of the frame 302 such that the track connector 350 may bring the track assembly 340 flush with the lateral periphery of the frame 302. In other embodiments, the track support 304 and/or support shaft 306 may be otherwise configured.

FIG. 3C illustrates the track connector 350 from a front and a side view. The track connector 350 includes a bolt flange 352 and a stub shaft 354. The bolt flange 352 connects to the track support 304 on the frame 302. The stub shaft 354 and the support shaft 306 are sized to mate with each other.

The bolt flange 352 can be connected to the frame 302 via bolts or other connectors in a removable track assembly 340 embodiment or may be welded or otherwise permanently connected to the frame 302 in a permanent track assembly 340 embodiment. Although a stub shaft 354 support shaft 306 configuration is described in the present embodiment, other track connector 350 track support 304 configurations are also contemplated.

Figures 4, 4A:
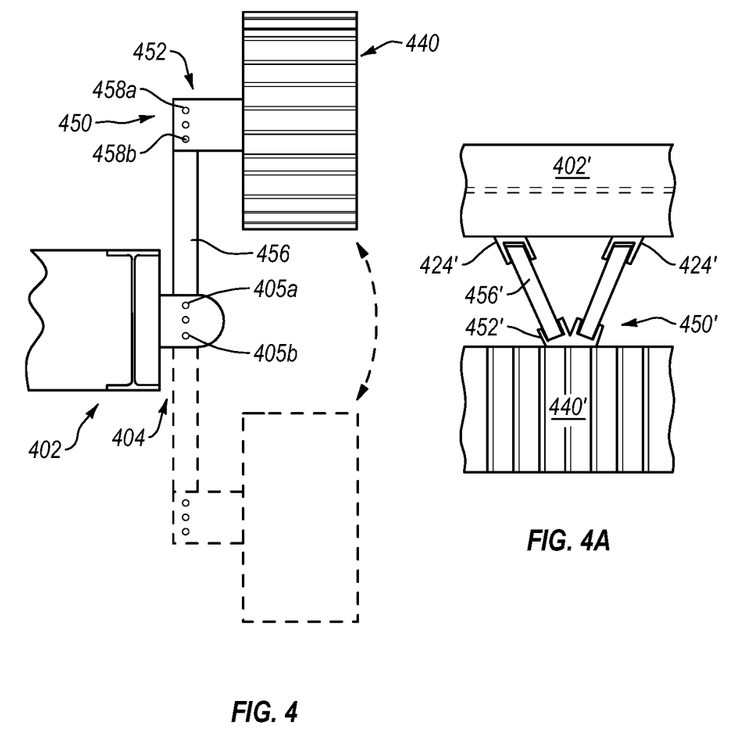
FIG. 4 illustrates a side view of another example embodiment of a track connector and track support.
FIG. 4A illustrates a top view of a further example embodiment of a track connector and track support

FIG. 4 illustrates a front view of one example embodiment of a track connector 450 and track support 404. The track connector 450 and track support 404 of this embodiment may be at least partially functionally similar to that of the track connectors 150, 250, 350 and track supports 104, 204, 304 previously described above and shown in FIGS. 1-3C in most respects, wherein certain features will not be described in relation to this embodiment wherein those components may function in the manner as described above and are hereby incorporated into this alternative embodiment described below. Like structures and/or components are given like reference numerals.

The track connector 450 of the present embodiment allows for movably coupling the track assembly 440 to the frame 402. The track assembly 440 is configured to be raised and/or lowered vertically with respect to the frame 402. In the present embodiment, the track connector 450 includes a flange 452 and an arm 456. The flange 452 is connected to the arm 456 by a pin joint. The flange 452 may be locked into position relative to the arm 456 with a flange lock 458a, 458b.

The track support 404 may be connected to the track connector 450 by the arm 456. The arm 456 may be connected to the track support 404 by a pin joint. The arm 456 may be locked into position relative to the track support 404 with a track support lock 405a, 405b.

As shown, the track assembly 440 is in a stowed configuration. In the stowed configuration, the arm 456 may be locked relative to the flange 452 with the stowed flange lock 458a and may be locked relative to the track support 404 with the stowed track support lock 405a. As shown in phantom, the track assembly 440 is in an engaged configuration. In the engaged configuration, the arm 456 may be locked with the engaged flange lock 458b and may be locked relative to the track support 404 with the engaged track support lock 405b. The track connector 450 as shown in FIG. 4 may be raised and lowered by means of a forklift or other lifting device. In other embodiments, the arm 456 may be counterweighted or otherwise modified such that the track assembly 440 may be raised and lowered manually.

FIG. 4A illustrates a top view of another example embodiment of a track connector 450' and track support 404'. The track connector 450' and track support 404' of this embodiment may be at least partially functionally similar to that of the track connectors 150, 250, 350, 450 and track supports 104, 204, 304, 404 previously described above and shown in FIGS. 1-4 in most respects, wherein certain features will not be described in relation to this embodiment wherein those components may function in the manner as described above and are hereby incorporated into this alternative embodiment described below. Like structures and/or components are given like reference numerals.

The track connector 450' shown in FIG. 4A includes a pair of arms 456' that connect to the track support 404' and to the flange 452'. The pair of arms 456' may provide additional lateral support to the track assembly 440'. The pair of arms 456 may connect to the frame 402' via frame connectors 424' and via the flange 452'.

Figure 5A:
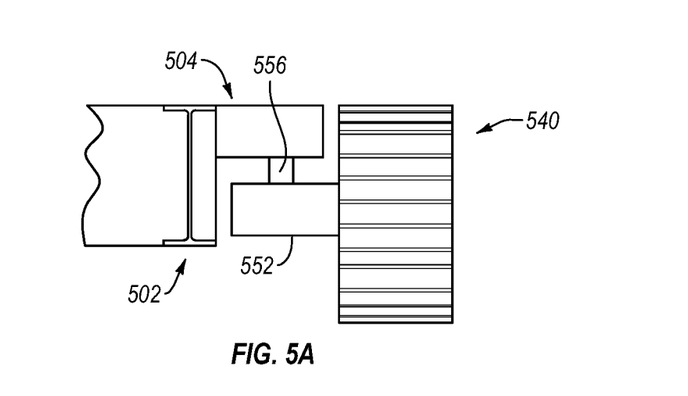
FIGS. 5A-5B illustrate side views of a further example embodiment of a track connector and track support.
Figure 5B:
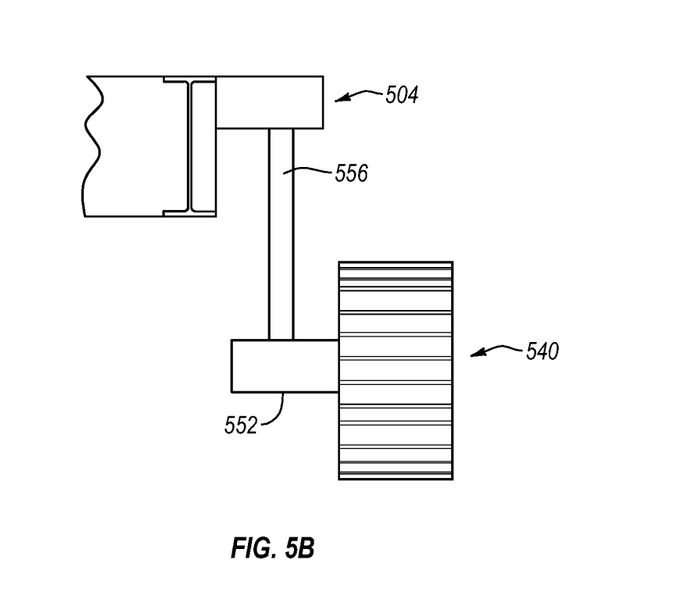

FIGS. 5A-5B illustrate front views of a further example embodiment of a track connector 550 and track support 504. The track connector 550 and track support 504 of this embodiment may be at least partially functionally similar to that of the track connectors 150, 250, 350, 450, 450' and track supports 104, 204, 304, 404, 404' previously described above and shown in FIGS. 1-4A in most respects, wherein certain features will not be described in relation to this embodiment wherein those components may function in the manner as described above and are hereby incorporated into this alternative embodiment described below. Like structures and/or components are given like reference numerals.

The track connector 550 of the present embodiment also allows for movably coupling the track assembly 540 to the frame 502. The track assembly 540 is configured to be raised and/or lowered vertically with respect to the frame 502. In the present embodiment, the track connector 550 includes a flange 552. The flange 552 is connected to the track support 504 via an arm 556. The arm 556 in the present embodiment is a hydraulic arm and the track support 504 includes a hydraulic pump.

As shown in FIG. 5A, the track assembly 540 is in a stowed configuration. In the stowed configuration, the arm 556 may be at least partially stowed within the track support 504 (i.e. the hydraulic pump). As shown in FIG. 5B, the track assembly 540 is in an engaged configuration. In the engaged configuration, the arm 556 may be extended such that the track assembly 540 engages the ground. The track connector 550 as shown in FIGS. 5A-5B may be raised and lowered by means of the hydraulic pump. In other embodiments, other mechanisms for automatically raising and/or lowering of the track assembly 540 may be used.

Figure 6:
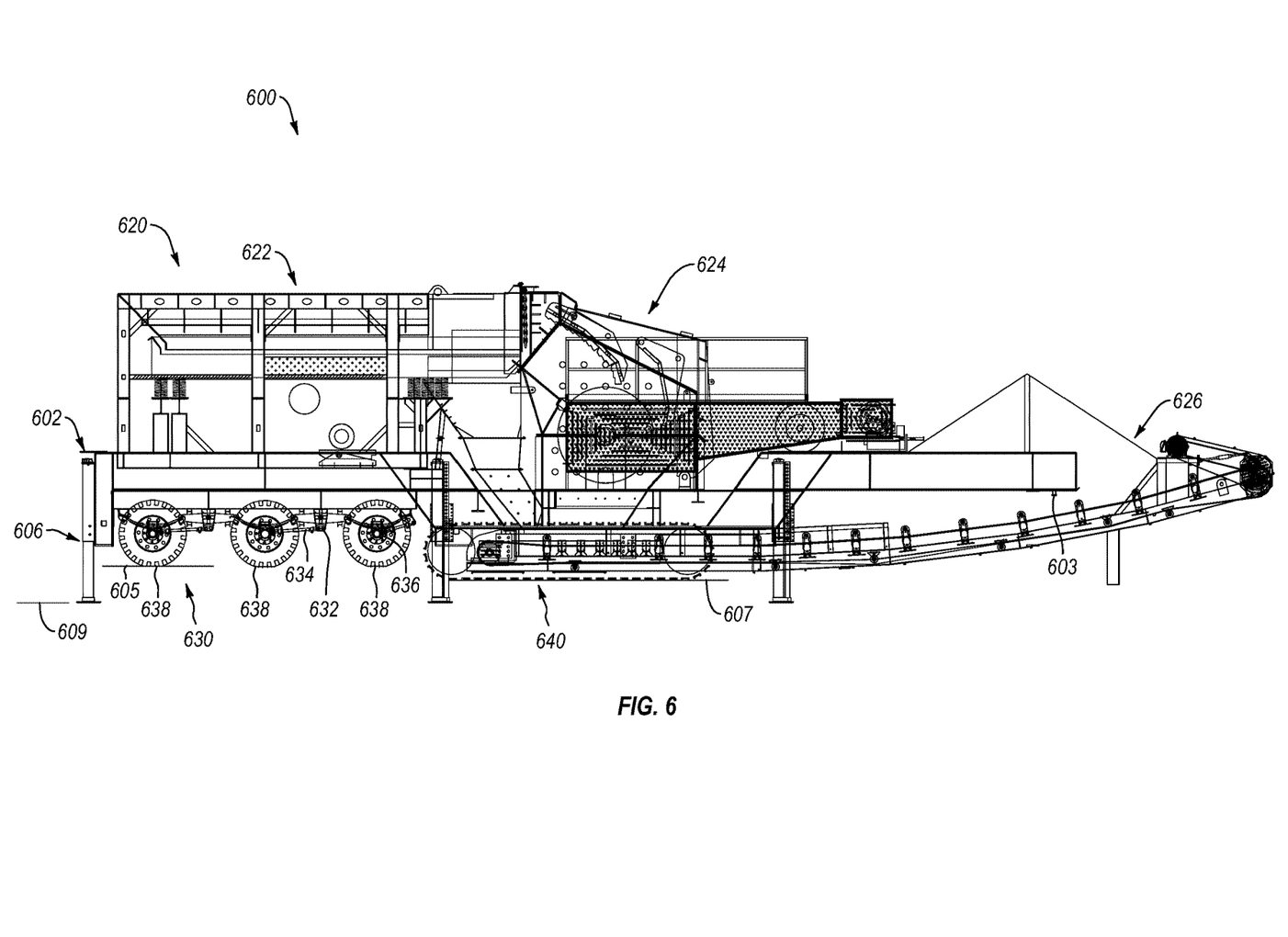
FIG. 6 illustrates a side view of another example embodiment of mobile industrial equipment.

FIG. 6 illustrates a side view of another example embodiment of mobile industrial equipment 600. The mobile industrial equipment 600 of this embodiment and its components (i.e. track connector 650 and track support 604) may be at least partially functionally similar to that of the mobile industrial equipment 100 and/or track connectors 150, 250, 350, 450, 450', 550 and track supports 104, 204, 304, 404, 404', 504 previously described above and shown in FIGS. 1-5B in most respects, wherein certain features will not be described in relation to this embodiment wherein those components may function in the manner as described above and are hereby incorporated into this alternative embodiment described below. Like structures and/or components are given like reference numerals.

The mobile industrial equipment 600 of FIG. 6 includes an industrial assembly 620. The industrial assembly 620 is a crushing assembly that may be used to crush rocks or other materials at a job site. The industrial assembly 620 includes a feeder 622, a crusher 624, and a conveyor 626. The feeder 622 is connected to the frame 602 and is used to hold the material to be crushed and direct the material to the crusher 624. The crusher 624 is connected to the frame 602. The conveyor 626 is connected to the frame 602 and is located below the crusher 624 such that the processed material falls to a crushing area of the conveyor 626. The conveyor 626 moves the processed material from the crushing area to a material transporter or to a pile of the material.

When the conveyor 626 is connected to the frame 602, the truck connector 603 may be blocked such that a semi-truck or other transport is unable to connect to the truck connector 603. In other embodiments, the conveyor 626 and/or another component of the industrial assembly 620 may prevent the semi-truck or other transport from connecting to the truck connector 603 without removing that component of the industrial assembly 620 from the frame 602. In further embodiments, the component of the industrial assembly 620 that is blocking the semi-truck or other transport may be adjusted or modified such that the semi-truck or other transport may connect to the truck connector 603. However, in most embodiments, the blocking component of the industrial assembly 620 will need to be removed.

However, because the mobile industrial equipment 600 includes a track assembly 640, the mobile industrial equipment 600 may be moved about a job site without removing any components of the industrial assembly 620. This will save time and money when moving the mobile industrial equipment 600 around a job site.

The industrial equipment 600 may include a plurality of stabilizers 606. The stabilizers may be located on the lateral periphery of the industrial equipment 600. The industrial equipment may include at least four stabilizers 606 and is shown in FIG. 6 with six stabilizers 606. More and/or fewer stabilizers 606 may be used. In some embodiments, the stabilizers 606 may be hydraulically driven and may be selectively deployed (extended) and/or stowed (retracted) as needed. In some embodiments, the stabilizers 606 may be powered by the onboard power plant 610. The stabilizers 606 may contact the ground at a stabilizer point of contact 609. As shown in FIG. 6, the stabilizer point of contact 609 is lower [vertically further from the frame 602] than the track point of contact 607, which is lower [vertically further from the frame 602] than the wheel point of contact 605. This provides additional support to the industrial equipment 600.

In other embodiments, the stabilizer point of contact 609 may be the same as the track point of contact 607. Having the same point of contact may allow both the track assembly 640 and at least one stabilizer 606 contact the ground at the same time.

It should be noted that in some embodiments, the industrial assembly may be operable regardless of the vertical relationship of its various components. For example, the industrial assembly 620 may be operable when the industrial equipment 600 is in a highway transport configuration (i.e. when the wheel assembly 630 is in contact with the ground), in an on-site configuration (i.e. when the track assembly 640 is in contact with the ground), in other configurations, or combinations thereof.

Although the industrial equipment 600 is shown with the wheel assembly 630 fixed to the frame 602 (via suspension connectors 632), in other embodiments, the track assembly 640 could be mounted in a fixed position relative to the frame 602 and the wheel assembly 630 could be raised and lowered by, for example, hydraulic lift mechanisms relative to the frame 602 and relative to the track assembly 640. In further embodiments, both the track assembly 640 and the wheel assembly 630 could be raised and/or lowered.

Figure 7:
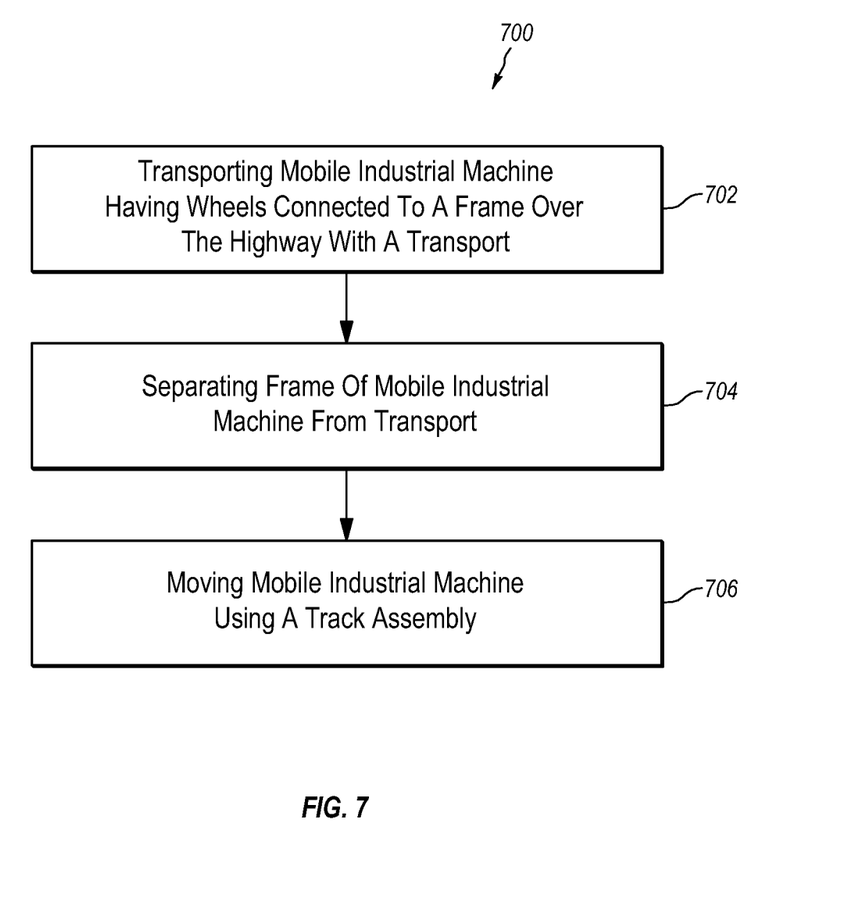
FIG. 7 illustrates an example embodiment of a method for using mobile industrial equipment.

FIG. 7 illustrates an example embodiment of a method 700 for using mobile industrial equipment. Embodiments of the mobile industrial equipment 100, 200, 300, 400, 400', 500, 600 described herein may be used in accordance with the method 700.

The method 700 includes an act of transporting mobile industrial equipment having wheels connected to a frame over the highway with a transport (act 702). In one example, the method may include transporting a mobile industrial machine having wheels permanently connected to the machine for the purposes of transporting, by semi-truck, for roads and/or highway use. The wheels may be connected to the frame using solid axles and/or may be driven. Conversely, in another embodiment, a track assembly could be mounted in a fixed position relative to the frame and the wheels could be raised and lowered by, for example, hydraulic lift mechanisms relative to the frame and relative to the track assembly. The transport may include a semi-truck or other transport. The transport may be directly connected to the frame using, for example, a truck connector such as a kingpin. In other embodiments, the mobile industrial equipment may be transported on a trailer bed that is connected to the transport. Although the embodiments described herein generally include a frame with wheels that are adapted to have a track assembly attached at a job site. Tracked vehicles may be adapted to include wheels and a truck connector in order to be transported over the highway.

After the mobile industrial equipment is transported to a job site (act 702), frame of the mobile industrial equipment is separated (act 704) from the transport. For example, the transport may be separated from the frame by disconnecting the truck connector (i.e. kingpin). In another example, the mobile industrial equipment may be removed from a trailer or other transport. Regardless, once the frame is separated from the transport, the mobile industrial equipment is not directly connected to the transport such that if the transport were, for example, to be driven away from the job site, the mobile industrial equipment would remain at the job site.

After the mobile industrial equipment is separated from the transport, the mobile industrial equipment is moved (act 706) about the job site using a track assembly. In one example, an independent traveling track system that uses electrical or hydraulic power may be installed on the job site so that the mobile industrial machine can travel independently without the use of highway tires. In another example, a removable track frame (i.e. track assembly) may be installed so that the mobile industrial machine can operate and travel on its own power for use at the job site other than for the purpose of transporting the mobile industrial machine on the highways and/or roads. For example, as described above, the track assembly may engage the ground while the wheels do not touch the ground. In other embodiments, it may be possible to have both the wheels and the track assembly touching the ground at the same time.

For the purpose of highway travel, the track frame (i.e. track assembly) and/or electrical or hydraulic power may be removed and the mobile industrial machine may be connected to a semi truck (via, for example, a kinpin) such that the mobile industrial equipment may be transported using permanently mounted highway wheels or tires over the road and/or interstate.

In some embodiments, where the track assembly is connected both on and off the job site, the track assembly may be self-propelled and operates via a generator or other electrical or hydraulic source.

Figure 8:
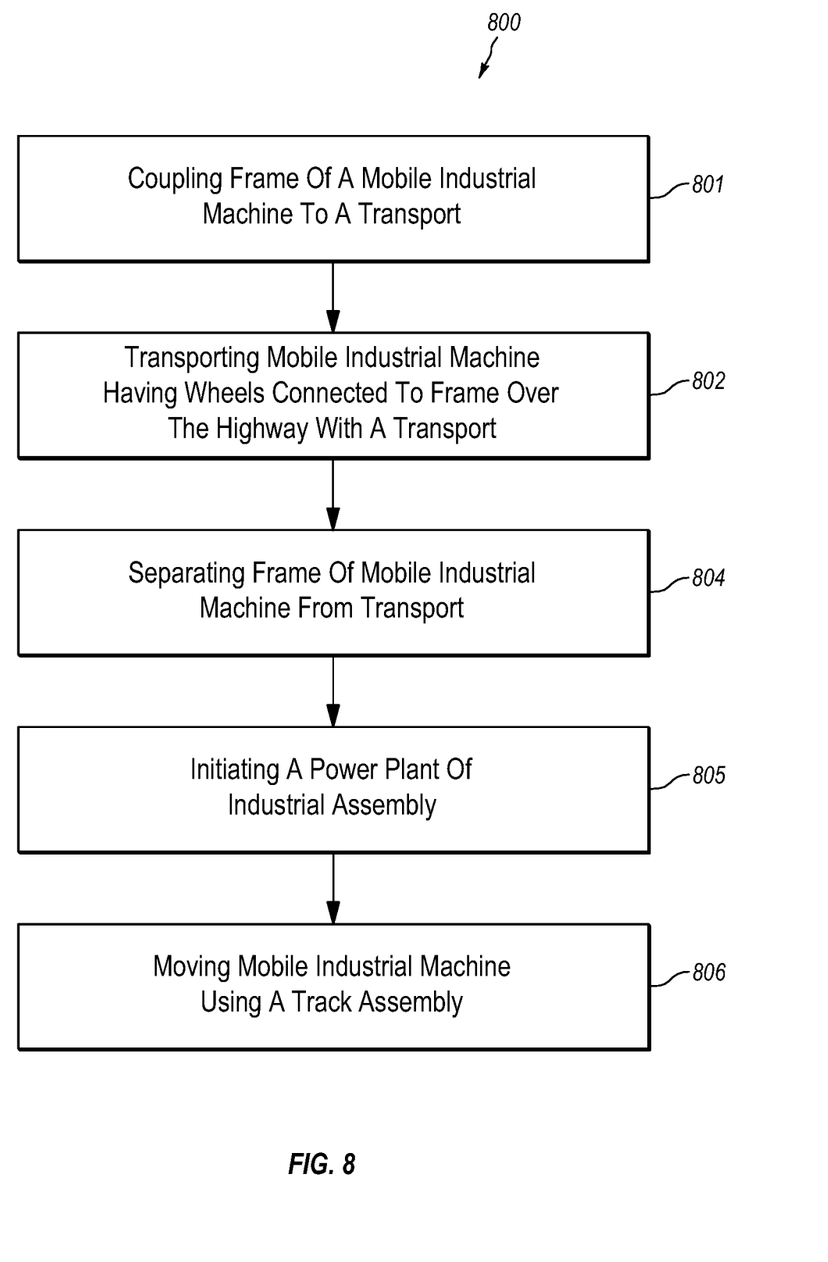
FIG. 8 illustrates another example embodiment of a method for using mobile industrial equipment.

FIG. 8 illustrates another example embodiment of a method 800 for using mobile industrial equipment. Embodiments of the mobile industrial equipment 100, 200, 300, 400, 400', 500, 600 described herein may be used in accordance with the method 800. The method 800 of this embodiment may be at least partially similar to that of the method 700 previously described above and shown in FIG. 7 in most respects, wherein certain features will not be described in relation to this embodiment wherein those acts may be performed in the manner as described above and are hereby incorporated into this alternative embodiment described below. Like structures and/or components are given like reference numerals.

The method 800 includes an act of coupling a frame of mobile industrial equipment to a transport (act 801). The frame may be coupled either directly or indirectly. For example, as described above, the frame may be directly coupled using, for example, a truck connector (e.g. kingpin) or may be indirectly coupled using a trailer (e.g. a low-boy).

The mobile industrial equipment has wheels connected to the frame and is transported over the highway with a transport (act 802). After the mobile industrial equipment is transported to a job site (act 802), frame of the mobile industrial equipment is separated (act 804) from the transport.

The mobile industrial equipment includes a power plant that may be initiated (act 805). This may include starting a generator that is connected to the frame and/or separate from the frame, connecting the power plant to a commercial power source, or otherwise initiating power on the mobile industrial equipment.

After the power plant of the mobile industrial equipment is initiated, the mobile industrial equipment is moved (act 806) about the job site using a track assembly. The track assembly may be powered by the power plant. In the present embodiment, the tracks are powered by a power source that is separate from the transporter used to transport the mobile industrial equipment (act 802).

In the present embodiment, the mobile industrial equipment may be moved about the job site by the track assembly only when an industrial assembly of the mobile industrial equipment is not being used. In other embodiments, the industrial assembly may be in use while the mobile industrial equipment is being moved by the track assembly. For example, it may be possible in the case of a crushing machine to both crush rock and move the crushing machine at the same time.

In some embodiments, the mobile industrial equipment needs to have at least a portion of its industrial assembly connected to the frame. Often this may occur after the mobile industrial equipment is transported to the job site (act 802). For instance, with a crushing machine, the industrial equipment may include a feeder, a crusher, a conveyor, other components, or combinations thereof. In some circumstances, it may have been necessary to remove least some of these components to facilitate highway transport, thereby requiring that such components may need to be reconnected to the frame at the job site. In these embodiments, the mobile industrial equipment may be moved (act 806) without disassembling and/or modifying any of the components of the industrial assembly. In other embodiments, some or all of the components of the industrial assembly and/or the mobile industrial equipment may be disassembled and/or modified. For example, the mobile industrial equipment may include stabilizers that may need to be adjusted before moving the mobile industrial equipment.

The mobile industrial equipment, in some embodiments, may be moved from one location at a job site to another location without being connected to the transporter that was used to transport it to the job site. For example, in a trenching operation, the transporter may be decoupled from the mobile industrial equipment at a first location (i.e. the start of the trench) at a job site. The industrial assembly may be used at the first location. Then, the mobile industrial equipment may be moved using the self-propelled track assembly to a second location without being coupled to the transporter. The industrial assembly may be again used at the second location (i.e. further down the trench). Then, the mobile industrial equipment may be moved using the track assembly to a third location without being coupled to the transporter, and so on.

In further embodiments, after the industrial assembly is connected to the frame and/or initiated, no components are disassembled and/or modified using a separate powered piece of industrial equipment. For example, the stabilizers may be moved using the power plant on the mobile industrial equipment. In another example, at least a portion of the conveyor may be adjustable using the power plant on the mobile industrial equipment. However, in these embodiments no crane, for example, is used to disassemble and/or modify any component of the mobile industrial equipment.

This disclosure is susceptible to various modifications and alternative components and/or acts, and specific examples thereof have been shown by way of example in the drawings and are herein described in detail. It should be understood, however, that the invention is not to be limited to the particular devices or methods disclosed, but to the contrary, the invention is to cover all modifications, equivalents, and alternatives falling within the spirit and scope of the claims.

What is claimed is:

1. Mobile industrial equipment for coupling to a truck for on highway transportation, comprising:
   a frame having a connector to connect to the truck;
   a wheel assembly, at least part of the wheel assembly being permanently connected to the frame, the wheel assembly including at least one axle, the at least one axle having at least a pair of wheels, the wheels being configured to contact a ground surface and being capable of transporting the mobile industrial equipment on the highway, the wheels being configured to contact the ground surface at a wheel point of contact relative to the frame; and
   a track connected to the frame such that the track contacts the ground surface at a track point of contact relative to the frame, the wheel point of contact being vertically closer to the frame than the track point of contact such that when the track contacts the ground, the wheels do not contact the ground, the track being configured to move the frame while the frame is uncoupled from the truck.

2. The mobile industrial equipment of claim 1, wherein the wheel assembly being located longitudinally behind the center of gravity of the mobile industrial equipment.

3. The mobile industrial equipment of claim 1, wherein the track is connected to the frame such that at least a portion of the track is centered relative to the center of gravity of the mobile industrial equipment.

4. The mobile industrial equipment of claim 1, wherein the track extends laterally beyond a lateral end of the wheel assembly.

5. The mobile industrial equipment of claim 1, wherein the track is removably connected to the frame.

6. The mobile industrial equipment of claim 1, wherein the track is selectively movable between a raised position and a lowered position.

7. The mobile industrial equipment of claim 1, further comprising a plurality of stabilizers connected to the frame, the plurality of stabilizers contacting the ground at a stabilizer point of contact relative to the frame, the stabilizer point of contact being vertically further from the frame than the wheel point of contact or the track point of contact such that when the machine is in operation, the plurality of stabilizers contact the ground but the track assembly and the wheels do not contact the ground.

8. The mobile industrial equipment of claim 1, wherein a power plant is coupled to the track assembly to transmit power to the track assembly but is not coupled to the wheel assembly such that the wheel assembly does not directly receive power from the power plant.

9. A mobile rock crushing device for coupling to a truck for on highway transportation, comprising:
   a frame having a connector to connect to the truck, the frame having a center of gravity;
   a wheel assembly at least partially permanently connected to the frame, the wheel assembly being located longitudinally behind the center of gravity of the frame; and
   a track connectable to the frame such that at least a portion of the track is centered relative to the center of gravity of the frame.

10. The mobile industrial equipment of claim 9, wherein the wheel assembly is located beneath and within a lateral periphery of the frame.

11. The mobile rock crushing device of claim 9, wherein the track assembly includes a first track and a second track that are configured to be moved both independently and simultaneously.

12. The mobile rock crushing device of claim 9, wherein the wheel assembly has a lateral end and the track has a lateral end, wherein the track lateral end is positioned laterally beyond the lateral end of the wheel assembly.

13. The mobile rock crushing device of claim 9, wherein the track is at least one of:
   selectively disconnectable from the frame to enable the wheels to contact a ground surface for transporting the mobile rock crushing device on the highway; or
   selectively movable from a lowered position to a raised position to enable the wheels to contact a ground surface for transporting the mobile rock crushing device on the highway.

14. Mobile industrial equipment for coupling to a truck for on highway transportation, comprising
   a frame having a truck connector to connect to the truck;
   a rock crushing machine mounted on the frame;
   a power plant configured to power the rock crushing machine;
   a plurality of wheels connected to the frame at a wheel connection point, and
   a track assembly connected to the frame at a track assembly connection point, wherein the track assembly is configured to move the mobile industrial equipment when the frame is disconnected from the truck, wherein the frame is rigid between the truck connector and the wheel connection point.

15. The mobile industrial equipment of claim 14, wherein the power plant is coupled to the track assembly to transmit power to the track assembly but is not coupled to the plurality of wheels such that the plurality of wheels does not directly receive power from the power plant.

16. The mobile industrial equipment of claim 14, wherein the track is selectively connectable to the frame.

17. The mobile industrial equipment of claim 14, wherein the track is selectively movable between a raised position and a lowered position with respect to the frame.

* * * * *